United States Patent [19]

Rea et al.

[11] Patent Number: 4,521,050
[45] Date of Patent: Jun. 4, 1985

[54] SHROUD TOP VENT GRILLE RETAINING MEANS

[75] Inventors: Gerald M. Rea, Sterling Heights; William G. Stoff, St. Clair Shores; John F. Zens, Algonac, all of Mich.

[73] Assignee: General Motors Corporation, Detroit, Mich.

[21] Appl. No.: 579,083

[22] Filed: Feb. 10, 1984

[51] Int. Cl.³ .............................................. B62D 25/08
[52] U.S. Cl. ..................................... 296/192; 296/194; 292/87; 292/76; 292/DIG. 73
[58] Field of Search ...................... 296/192, 194, 84 R; 292/87, 80, 76, DIG. 73, DIG. 92, DIG. 38

[56] References Cited

U.S. PATENT DOCUMENTS

| | | | |
|---|---|---|---|
| 3,596,978 | 8/1971 | Wessells | 296/194 |
| 3,845,983 | 11/1974 | Heintz | 296/84 R |
| 4,393,560 | 7/1983 | Kato | 296/84 R |
| 4,466,654 | 8/1984 | Abe | 296/192 |

FOREIGN PATENT DOCUMENTS 103272  6/1982  Japan ................................. 296/192

Primary Examiner—Robert R. Song
Attorney, Agent, or Firm—William A. Schuetz

[57] ABSTRACT

A shroud top vent grille is releasably retained or attached to the front fenders of a vehicle by a retainer means. The retainer means comprises a pair of headed weld studs welded to an inner wall of the fender a predetermined distance below its upper external surface and a one piece plastic retainer member which can be readily secured to the weld studs and which is adapted to releasably retain the shroud top vent grille in place and so that it is flush with the adjacent external fender while preventing rattling.

2 Claims, 5 Drawing Figures

SHROUD TOP VENT GRILLE RETAINING MEANS

The present invention relates to a retaining means for attaching a panel to a vehicle and more particularly, to a retaining means for releasably retaining a shroud top vent grille on a vehicle.

Some automotive vehicles have a metal or plastic shroud top vent grille located adjacent the windshield and rearwardly of the hood to provide an air intake for fresh air into the passenger compartment of the vehicle. While various fastening means have been employed to hold the vent grilles in place, they have not always been satisfactory from the standpoint of insuring flushness with the adjacent external fender structure of the vehicle.

In accordance with the provisions of the present invention, a novel retainer means is provided for attaching a shroud top vent grille to its adjacent fender structure so that flushness with the adjacent external fender structure is achieved. The retainer means allows the grille to be readily attached to the fender structure and in a manner which prevents rattling and which also allows the grille to be readily detached from the adjacent fender structure, when necessary to do so.

Accordingly, it is an object of the present invention to provide a new and improved retainer means for retaining a vehicle panel, such as a shroud top vent grille, in place, and which enables the panel to be readily attached to and detached from the vehicle, which functions as an anti-rattle device, and which provides for flushness with the adjacent external body or fender structure.

Another object of the present invention is to provide a new and improved retainer means for retaining a shroud top vent grille in place, and in which the retainer means can be readily attached to the fender a predetermined distance froms its upper external surface and in which the retainer means comprises a base portion and upwardly extending fore, middle and aft arms integral with the base portion, the middle arm being deflectable and having a transversely extending barb at its upper free end and the fore and aft arms at their free ends defining a curved leaf spring, and in which the shroud top vent grille has downwardly extending legs provided with longitudinally extending slots, and wherein the middle arm is deflectable by the downwardly extending legs of the vent grille when being attached to the retaining means until the slots are aligned with the barb whereupon the middle arm will self return to its normal position to secure the vent grille in place, and wherein the curved leaf springs engage the underside of the vent grille to prevent rattling thereof.

Yet another object of the present invention is to provide a new and improved retainer means, as defined in the next preceding object, and in which the barbs on the middle arm also have tapered sides which are engageable by legs of the shroud top vent grille when moved fore or aft so that the arms can be deflected out of the way to allow for easy removal of the vent grille.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
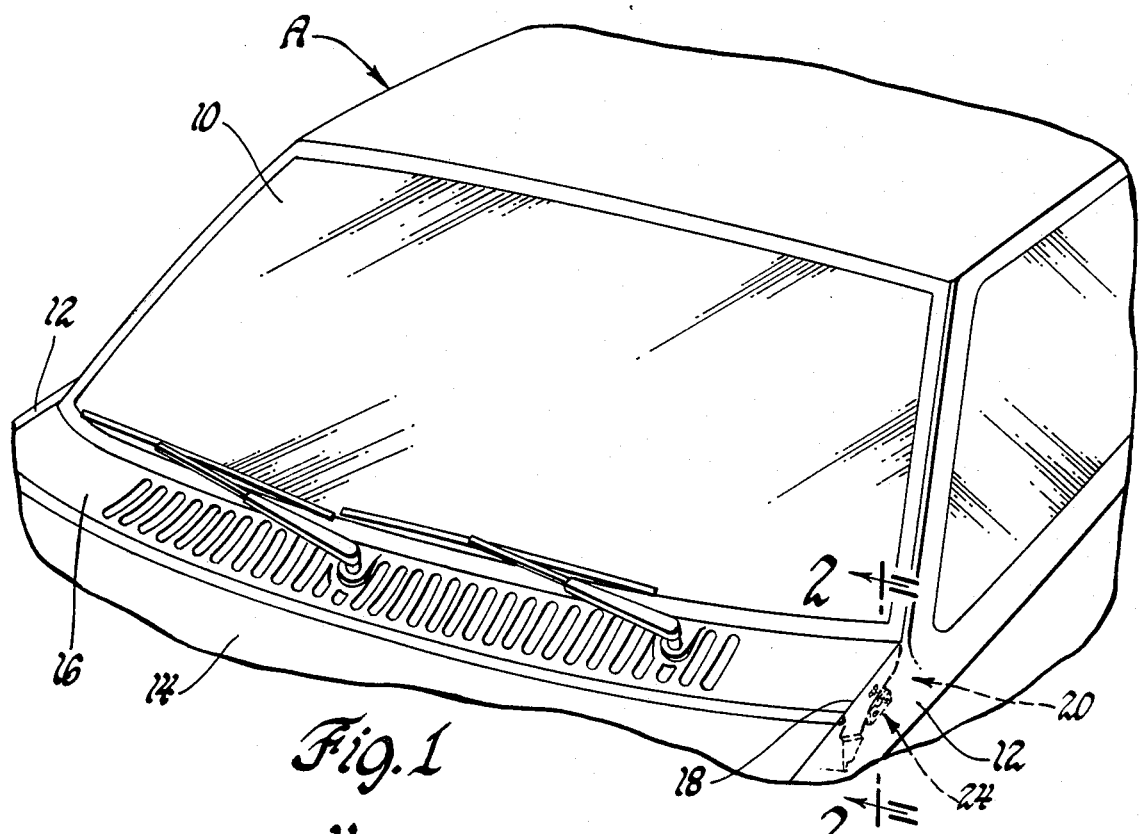
FIG. 1 is a fragmentary perspective view of a vehicle having a shroud top vent grille.

Referring to FIG. 1 of the drawings, an automotive vehicle A is thereshown. The vehicle A includes a windshield 10, left and right front side fenders 12, a hood 14 whose rearward end is spaced forwardly of the windshield 10 and a shroud top vent grille 16 disposed between the rearward end of the hood 14 and the windshield 10. The vent grille 16 covers a transversely extending opening or slot 18 and provides an intake for fresh air into the passenger compartment of the vehicle A.

In accordance with the provisions of the present invention the shroud top vent grille 16 is releasably retained or attached to the front fenders 12 of the vehicle A by a novel retainer means 20. The retainer means 20 comprises, in general, a pair of headed weld studs welded to an inner wall 12a of the fender 12 a predetermined distance below its upper external surface 12b and a one piece plastic retainer member 24 secured to the weld studs 22 and which is adapted to releasably retain the shroud top vent grilles 16 in place.

The shroud top vent grille 16 is made from a suitable plastic material and has a pair of downwardly extending legs 30 at its right and left ends, as viewed in FIG. 1. Since both the right and left legs are of identical construction, only the right leg 30, as viewed in FIG. 1, will be shown and described in detail. The downwardly extending leg 30 has a horizontally extending slot 32 therethrough, and for a reason to be hereinafter more fully described.

Figure 2:
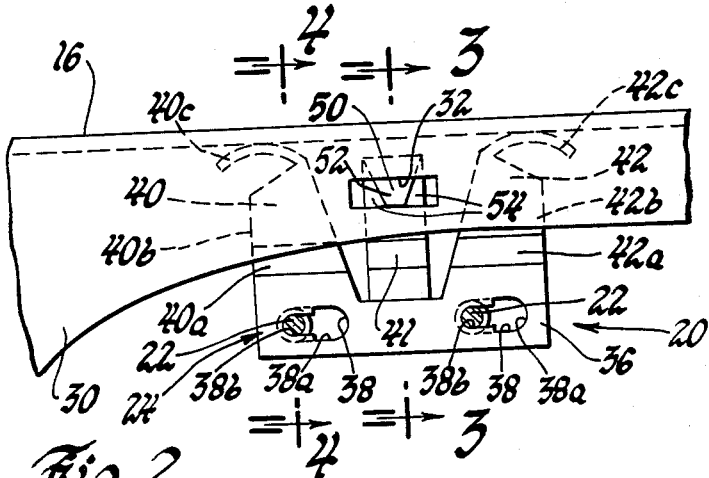
FIG. 2 is an enlarged side elevational view, with a portion shown in section, and taken along the lines 2—2 of FIG. 1.
Figure 3:
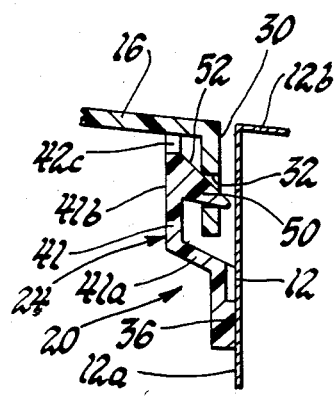
FIG. 3 is a fragmentary cross sectional view taken along the lines 3—3 of FIG. 2.
Figure 5:
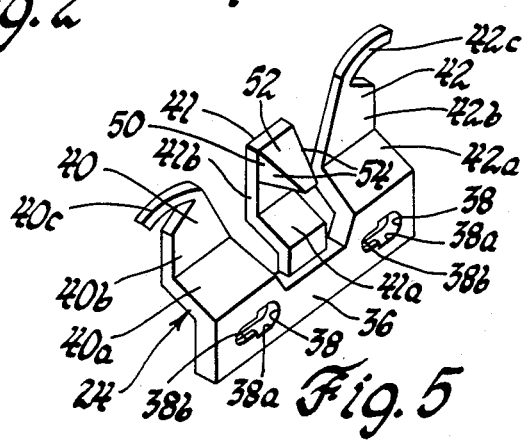
FIG. 5 is a perspective view of part of the novel retaining means of the present invention.
Figure 4:
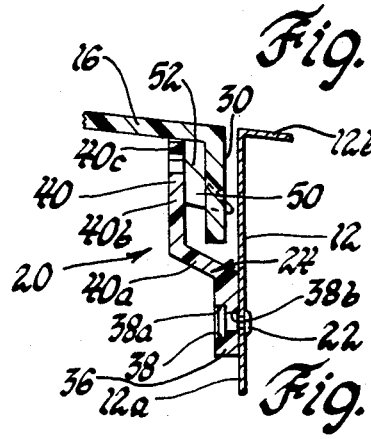
FIG. 4 is a fragmentary sectional view taken along the lines 4—4 of FIG. 2.

The one piece retainer member 24 is molded from a suitable plastic material and comprises a base or base portion 36, having two spaced apart openings 38 therethrough. The openings 38 are shaped to provide an enlarged opening portion 38a at one end and a smaller opening portion 38b at their other end. The shape of the openings 38 is such that the large opening end portions 38a can freely pass over the head of the headed weld studs 22 and then the base 36 can be secured to the weld studs by pushing the member 24 to the right, as viewed in FIG. 2. This movement causes the smaller opening portions 38b to frictionally receive the stems of the weld studs 12 and the heads of the weld studs 12 to be positioned behind the base 36 to secure and retain the retainer 24 in place on the inner wall 12a of the fender 12.

The retainer 24 also includes three spaced apart upwardly extending arms 40, 41 and 42. The arms 40, 41 and 42 have laterally extending portions 40a, 41a and 42a which extend transversely of the base 36 and upwardly extending, vertically disposed portions 40b, 41b and 42b, respectively. The arms 40 and 42, which are located fore and aft of the middle arm 41, as viewed in FIG. 2, have their upper free ends terminating in curved, deflectable leaf springs 40c and 42c, and for a reason to be hereinafter more fully described.

The middle arm 41 of the retainer member 24 at its upper free end has a transversely extending barb 50 which extends towards the inner wall 12a of the fender 12. The barb 50 has a tapered upper surface 52 which tapers downwardly proceeding from the arm 41 towards its free end. The barb 50 also has tapered sides 54 which taper toward each other proceeding from the arm 41 towards the free end of the barb 50. The arm 41 is deflectable toward and from the inner wall 12a of the fender 12 and is self-biased toward its normal free state position, as shown in the drawings.

The shroud top vent grille 16 is secured to the retainer member 24 by placing the grille over the opening 18 and moving the vent grille 16 downwardly. It should be understood that two retainers 24 are employed, one secured to the inner wall of the left fender 12 and one secured to the inner wall of the right fender 12. The downward movement of the vent grille 16 will cause the legs 30 to engage the tapered surfaces 52 of the barb 50 as it is moved downwardly. This causes the arms 41 to be deflected laterally away from the inner walls 12a of the fenders 12 until the barb 50 is aligned with the slots 32 in the legs 30 whereupon the self biasing force of the plastic arms 41 will cause the same to move towards their normal free state position and with the barbs 50 being located within the slots 32. As this occurs, the shroud top vent grille 16 along its underside will engage the curved leaf spring 40c and 42c and cause the same to be deflected from their normal free state position. The leaf springs 40c and 42c serve as an anti-rattle feature by biasingly holding the shroud top vent grille 16 against the barbs 50 of the arms 41.

The shroud top vent grille 16 when attached to the retainer members 24, can also be readily detached from the retainer members 24. This is accomplished by moving the shroud top vent grille 16 either fore or aft until the legs 30 thereof defining the end of the slots 32 engage the tapered sides 54 of the middle arms 41. Further pushing in the fore or aft direction will cause the arms 41 to be deflected away from the inner wall 12a of the fender 12 from its normal free state position until the slots clear the barbs 50 whereupon the vent top shroud grille 16 can be removed from the vehicle A.

From the foregoing, it should be apparent that by locating the weld studs 22 a predetermined distance from the upper surface 12b of the fender and the slots 32 a predetermined distance beneath the top of the vent grille 16 that good control of the flushness between the vent grille 16 and the upper wall 12b of the fender 12 can be achieved. It should also be apparent that the retaining means 20 can be readily attached to the weld studs 22, that the vent grille 16 can be readily attached to the retainer members 24 and that the retainer members 24 securely retain the vent grille 16 in place and in a manner which prevents rattling. It should further be apparent that the shroud top vent grille 16 can be readily removed from the vehicle by merely moving the same fore or aft and then reassembled at a later time.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having body structure including left and right fenders defining a body opening, said fenders having inner and outer side walls and an outer top wall, a generally U-shaped panel for covering said opening, said panel having a top and left and right downwardly extending legs disposed within said opening, and left and right retaining means carried by the inner walls of said left and right fenders, respectively, for retaining said panel in place, the improvement being that said left and right legs have a generally horizontally extending slot therethrough and that each of said retaining means comprises a base portion which is secured to the inner side wall of its adjacent fender a predetermined distance below the top wall of the fender, spaced apart, upwardly extending fore, middle and aft arms integral with said base portion, said middle arm being deflectable and having a transversely extending barb at its upper free end, said barb having at least one side which is tapered, said fore and aft arms at their free ends defining a curved leaf spring, said legs of said panel engaging said barbs on said middle arms and causing the latter to be deflected from their normal free state position until said barbs are aligned with said slots on said legs whereupon said arms self return toward their normal free state position and are disposed within said slots to retain said panel in place, said leaf springs on said fore and aft arms biasingly engaging said panel on its underside to bias the panel against the barbs to prevent rattling of the panel and to position the panel so that its outer side is flush with the outer top walls of the left and right fenders, said legs of said panel along their edges defining an end of the slots engaging said tapered sides of said barbs when the panel is moved into engagement with the tapered sides to cause the middle arms to be deflected from their normal free state position to release the panel from the middle arms to allow removal of the panel.

2. In an automotive vehicle having body structure including left and right fenders extending forwardly of the windshield and defining an opening located forwardly of the windshield, said fenders having inner and outer side walls and an outer top wall, a generally U-shaped vent grille panel for covering said opening and having first and second downwardly extending legs disposed within said opening, and first and second retaining means secured to said left and right fenders, respectively, for retaining said vent grille panel in place, the improvement being that each of said legs of said panel has a generally horizontally extending slot therethrough and that each of said retaining means comprises a one piece plastic member having a base which is secured to the inner side wall of its adjacent fender a predetermined distance below the top wall of the fender, a deflectable middle arm extending upwardly from the base and having a transversely extending barb at its free end, said barb on its top side being tapered downwardly proceeding from the arm toward its free end, said barb having lateral sides which are tapered toward each other proceeding from the arm toward its free end, first and second end arms located fore and aft of the middle arm and which extend upwardly from the base and whose free ends define a deflectable curved leaf spring, said legs of said panel engaging said barbs on said middle arms and causing the latter to be deflected from their normal free state position until said barbs are aligned with said slots on said legs whereupon said arms self return toward their normal free state position and are disposed within said slots to retain said panel in place, said leaf springs on said end arms biasingly engaging said panel on its underside to bias the panel against the barbs to prevent rattling of the panel and to position the panel so that its outer side is flush with the outer top wall of the fender, said legs of said panel along its edges defining the ends of the slots engaging a tapered side of said barbs when the panel is moved fore or aft to cause the middle arms to be deflected from their normal free state position to release the panel from the arms to allow removal of the panel.

* * * * *